US006264774B1

(12) United States Patent
Lenz et al.

(10) Patent No.: US 6,264,774 B1
(45) Date of Patent: Jul. 24, 2001

(54) CARD LAMINATOR WITH REGULATORY CONTROL

(75) Inventors: Gary A. Lenz; Aurelian Dumitru, both of Eden Prairie, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 09/379,417

(22) Filed: Aug. 23, 1999

(51) Int. Cl.$^7$ .................................................. B32B 31/04
(52) U.S. Cl. ........................ 156/64; 156/359; 156/384; 156/555
(58) Field of Search ..................... 156/64, 277, 359, 156/384, 387, 555, 582, 583.1

(56) References Cited

U.S. PATENT DOCUMENTS

| | | | |
|---|---|---|---|
| 5,203,756 | 4/1993 | Taguchi et al. | 492/16 |
| 5,394,322 | 2/1995 | Hansen | 364/148 |
| 5,445,700 | * 8/1995 | Uang | 156/359 |
| 5,476,568 | * 12/1995 | Marion et al. | 156/359 |
| 5,571,368 | * 11/1996 | Barge | 156/359 |
| 5,642,301 | 6/1997 | Warrior et al. | 364/571.02 |
| 5,746,878 | 5/1998 | Kuhns et al. | 156/364 |
| 5,813,587 | 9/1998 | Nordgren | 226/29 |
| 5,818,714 | 10/1998 | Zou et al. | 364/154 |
| 5,885,410 | 3/1999 | Berkan | 156/582 |

OTHER PUBLICATIONS

"Control Components", by Fisher Controls Company, pp. 124–128, (1971).
pp. 124–128 from the book entitled "Control Components".

* cited by examiner

Primary Examiner—James Sells
(74) Attorney, Agent, or Firm—Westman, Champlin & Kelly, P.A.

(57) ABSTRACT

An identification card laminator for laminating a protective layer to an identification card substrate, includes a substrate positioner configured to secure the substrate during lamination, a protective layer positioner configured to position the protective layer on the substrate during lamination and a heat source proximate the film positioner configured to heat the protective layer in response to a control signal. A temperature sensor proximate the protective layer positioner is configured to provide a temperature output related to a temperature of the film and the heat source. A controller coupled to the heat source is configured to provide the control signal to the heat source as a function of the temperature signal, the control signal having at least two values.

45 Claims, 6 Drawing Sheets

CARD LAMINATOR WITH REGULATORY CONTROL

BACKGROUND OF THE INVENTION

The present invention relates to laminators of the type used to laminate a protective film onto a substrate such as an identification card substrate. More specifically, the present invention relates to controlling a heat source used in such laminators.

Laminators are machines that apply a polymer film overlay to a substrate material to improve the durability of the substrate. Laminators are well known for the application of polymeric films to paper. Such laminators are used to apply a thin polymer chip or web to a plastic ID card to improve the durability of the card. Recently, Fargo Electronics, Inc. introduced a printer with an intermediary transfer layer for the production of plastic ID cards. In this printer, a reverse image is printed on a thin polymeric web which is then laminated to the card.

Lamination is generally recognized to be a process requiring a heat source and a machine for applying a pressure to a thin laminate material to laminate a receiving substrate. Commercial laminators used for the lamination of thin films to plastic cards can be standalone machines in which a printed card is fed into the laminator where a overlay film or chip is applied to the card. The laminator can also be integrated into the printer.

Laminators include a heat source such as a hot roller, hot plate, cavity heat source, or thermal print head/platen assembly which is applied to a thin film mechanically positioned to force the film against a receiving card. The heat source typically converts electrical energy to thermal energy with a resistive heating element. This heat conversion process is a slow thermal process. As the card is feed through the laminator the heat source cools quickly and the trailing edge of the card is laminated at a substantially lower temperature. This reduction in temperature can result in poor lamination or adhesion of the laminated layer to the trailing edge of the card.

A conventional approach to controlling the thermal heat source is to use an on-off control strategy, commonly referred to as "bang—bang," where a controller provides a setpoint of the desired laminating temperature to a circuit which controls the heat source. A temperature sensor, typically a thermocouple or RTD, provides temperature feedback to the controller. When the heater temperature arrives at the setpoint, the lamination process starts. When the temperature sensor detects that the laminating heat source has changed due to cooling of the heat source below the card/film lower limit, the controller adjusts the circuit to increase the conversion of electrical power to thermal energy. This type of control is "bang—bang".

Bang—bang control is very simple and cost effective to implement, but often will result in inferior cards as the temperature controller is not able to respond fast enough to the cooling of the heater. The result is a highly variable lamination process parameter along the card.

Further, some laminators must function with a variety of card materials, film materials, and card sizes. The variability introduced by changing thermal masses (card volume) provides a significant challenge to providing high quality laminated cards. Traditional bang-bang control approaches require that a set of lamination parameters be developed for each individual card material/size/laminate and that the lamination temperature and time be adjusted to get the best possible results.

This method is time consuming and sometimes impractical for large enterprises who may run large numbers of different cards and films. Further, the bang-bang control strategy does not provide good process control and laminate adhesion problems result when the heat source is cooled below the required minimum lamination temperature. Attempts to compensate for cooling by starting with a higher lamination temperature result in scorched or melted lamination on the leading edge of the card.

U.S. Pat. No. 5,746,878, issued May 4, 1998 to Kuhns et al., entitled "VARIABLE EFFECTIVE TEMPERATURE LAMINATOR THERMAL BINDER" describes a technique in which the dwell time of a substrate within the laminator is adjusted to achieve a desired level of heating. Further, U.S. Pat. No. 5,203,756, issued Apr. 20, 1993 to Taguchi et al., entitled "LAMINATOR" discusses a laminator in which a phase control type PID controller is used to turn the heating element of the laminator on and off. This design does not provide a regulatory type control signal and the heating of the laminator can only be very controlled.

SUMMARY OF THE INVENTION

An identification card laminator for laminating a protective layer to an identification card substrate, includes a substrate positioner configured to secure the substrate during lamination, a protective layer positioner configured to position the protective layer on the substrate during lamination and a heat source proximate the protective layer positioner configured to heat the layer in response to a control signal. A temperature sensor proximate the protective layer positioner is configured to provide a temperature output related to a temperature of the layer and the heat source. A controller coupled to the heat source is configured to provide the control signal to the heat source as a function of the temperature signal, the control signal having at least two values.

DETAILED DESCRIPTION OF THE ILLUSTRATIVE EMBODIMENTS

Figure 1:
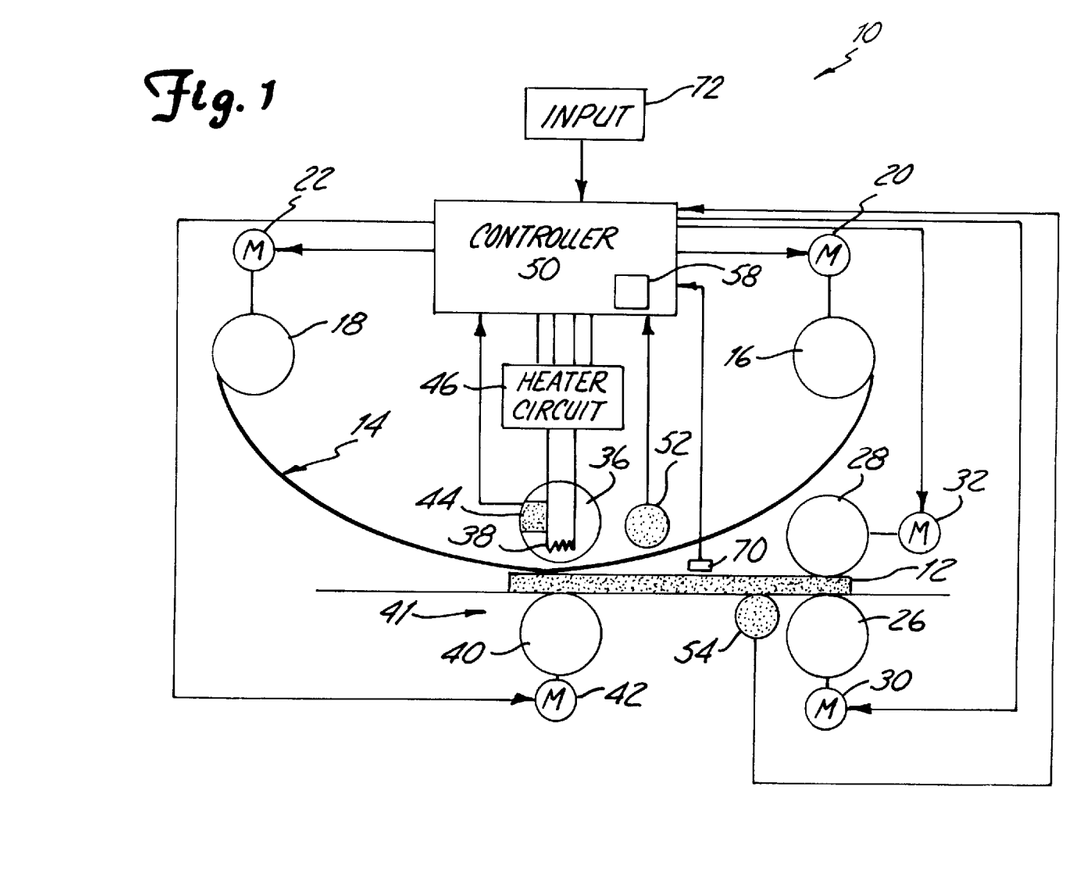
FIG. 1 is a simplified block diagram of a laminator in accordance with one embodiment of the invention.

FIG. 1 is a simplified diagram of a laminator 10 in accordance with one embodiment of the present invention for laminating a protective film onto an identification card substrate 12. Laminator 10 carries a web 14 having a protective film carried thereon between supply roller 16 and take up roller 18 operated by motors 20 and 22, respectively. Rollers 26 and 28 provide a card positioner and are operated, respectively, by motors 30 and 32. A heat roller 36 carries a heat source 38 therein and is positioned opposite a pressure roller 40 operated by motor 42. Rollers 36 and 40 provide an example of one type of film positioner 41. A temperature sensor 44, such as a RTD or thermocouple, is positioned proximate roller 36 and provides an output to controller 50. The heat source 38 is operated by heater circuit 46 under the control of controller 50.

Laminator 10 operates under the control of controller 50 which actuates motors 30 and 32 to move card 12 through laminator 10 while simultaneously actuating motors 20 and 22 to move web 14 between rollers 16 and 18. A sensor 52 is positioned to detect the protective film carried on web 14 and provides an output to controller 50 to synchronize web 14 with card 12. Controller 50 actuates motor 42 to provide pressure against roller 36 during the lamination process. The position of card 12 is determined using card position sensor 54 which also provides an output to controller 50. Controller 50 typically comprises a microprocessor such as a Motorola microprocessor 68HC05, 68HC08, 68HC11, 68HC12 or 68HC16. Other types of microprocessors used in laminators which provide more powerful processing capabilities include a Motorola MPC821 or MPC823 or ATMEL's model AT90S8535 or AT90S8515. However, any appropriate microprocessor can be used with the present invention provided that the processing speed is sufficiently fast to yield the desired laminating speed. Controller 50 also includes memory 58 which is used to store programming instructions, temporary variables or constants used for control of heat source 38 as described herein. Additionally, the memory 58 can store time, temperature and pressure values for different types of substrates 12.

Typically, heater circuit 46 is used to adjust the current and/or voltage applied to heat source 38. For example, the control can be a pulse width modulation (PWM) signal, such as, a signal having a frequency of 900 Hz and a duty cycle of between 1% and 99%.

It should be noted that FIG. 1 is a simply one example of a laminator 10. The present invention can be implemented with other types of laminators or configurations. For example, various types of laminators include heater roller laminators, hot plate laminators, cavity laminators and radiant heated roller laminators. In another embodiment, heat source 38 comprises a thermal print head and web 14 carriers coloured dye in addition to the protective film. The print head is used to print with the coloured dye and to laminate the substrate 12 with a protective layer. Another heat source that can be controlled with the invention is a card straightener. Various types of heat sources include resistance or quartz elements.

Controller 50 implements a regulatory control algorithm in accordance with the present invention and controls heat source 38 to levels other than a strictly "on" or "off" state as is characterized by "bang—bang" type control algorithms. One type of regulatory control algorithm in accordance with one embodiment of the invention is a proportional integral derivative (PID) control algorithm. In such an embodiment, the controller 50 detects errors in the value of a control variable, the heat provided by heat source 38, and generates a corrective signal which is a predetermined function of the error. This feed back can be any combination of a proportional, integral or derivative of the control signal output. The controller 50 uses an adjustable reference or set point against which the controlled variable can be compared. The resulting error signal is then conditioned by a feedback path which typically includes an amplifier to give the desired control action.

PID stands for Proportional, Integral, Derivative. Controllers are designed to eliminate the need for continuous operator attention. Cruise control in a car and a house thermostat are common examples of how controllers are used to automatically adjust some variable to hold the measurement (or process variable) at the set-point. The set-point is where you would like the measurement to be. Error is defined as the difference between set-point and measurement. The variable being adjusted is called the manipulate variable which usually is equal to the output of the controller. The output of PID controllers will change in response to a change in measurement or set-point. Manufacturers of PID controllers use different names to identify the three modes.

With proportional control, the controller output is proportional to the error or a change in measurement (depending on the controller):

(controller output)=(error)*100/(proportional band)   Eq. 1

With a proportional controller offset (deviation from set-point) is present. Increasing the controller gain will make the loop go unstable. Integral action was included in controllers to eliminate this offset.

With integral control, the controller output is proportional to the amount of time the error is present. Integral action eliminates offset:

CONTROLLER OUTPUT=(1/INTEGRAL)(Integral of )
$e(t)d(t)$   Eq. 2

Integral action gives the controller a large gain at low frequencies that results in eliminating offset and "beating down" load disturbances. The controller phase starts out at −90 degrees and increases to near 0 degrees at the break frequency. This additional phase lag is what you give up by adding integral action. Derivative action adds phase lead and is used to compensate for the lag introduced by integral action. With derivative control, the controller output is proportional to the rate of change of measurement or error. The controller output is calculated by the rate of change of the measurement with time.

$$\text{CONTROLLER OUTPUT} = \text{DERIVATIVE}\frac{dm}{dt} \qquad \text{Eq. 3}$$

Where m is the measurement at time t.

Derivative action can compensate for a changing measurement. Thus derivative takes action to inhibit more rapid changes of the measurement than proportional action. When a load or set-point change occurs, the derivative action causes the controller gain to move the "wrong" way when the measurement gets near the set-point. Derivative is often used to avoid overshoot. Derivative action can stabilize control loops since it adds phase lead. Generally, if you use derivative action, more controller gain and reset can be used.

Figure 2:
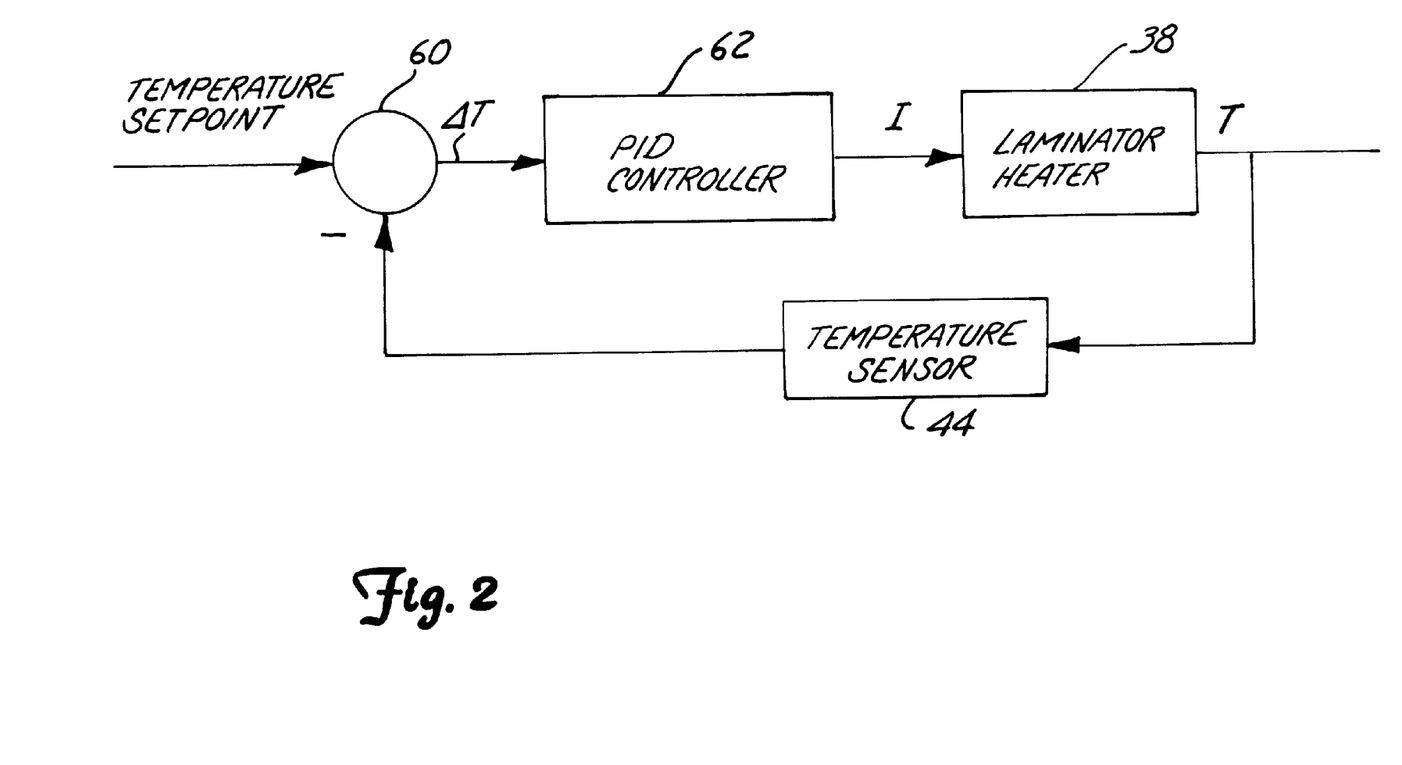
FIG. 2 is a simplified block diagram of a regulatory control system used in the laminator of FIG. 1.
Figure 3:
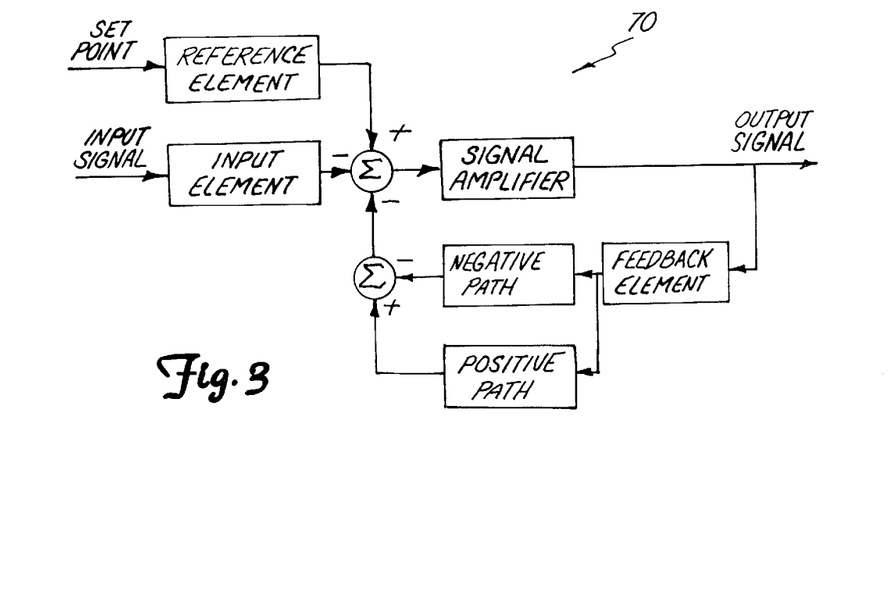
FIG. 3 is a diagram of a three mode regulatory control system.

FIG. 2 is a simplified block diagram of such a PID control implementation in which temperature sensor 44 provides feedback from heat source 38 to a summing node 60. The output from temperature sensor 44 is subtracted from a temperature set point by summing node 60 which provides a ΔT output which is an error signal to PID controller 62. PID controller 62 is implemented by controller 50. FIG. 3 is a simplified diagram of a more complex controller implementation using two stages in order to achieve a sufficient forward path gain and an adequate output power. One design offering a great deal of flexibility is a three-mode controller in which the corrective signal is the sum of three distinct components, one proportional to the error magnitude, one proportional to the time integral of the error magnitude and one proportional to the time derivative of the error magnitude, i.e., an PID controller. The transfer function for an ideal three-mode controller is given by Equation 4 with the three terms inside the brackets providing, respectively, the proportional, integral and derivative modes.

$$\frac{(\text{output})}{(\text{input})} = G_c = K\, K_c\left[\left(1 + \frac{T_d}{T_1}\right) + \frac{1}{T_1 S} + T_d S\right] \quad \text{Eq. 4}$$

where K is the ratio of the nominal output span to the nominal input span and $K_C$ is an adjustable parameter called proportional gain. $T_1$ is an integral time constant and Td is a derivative time constant.

Such controllers can use the individual P, I and D components either alone or in their combinations. Typical examples include P-based controllers, I-based controllers, PI-based controllers, PD-based controllers and PID-based controllers.

The transfer functions for any of these combinations can be derived from Equation 1 by deleting the appropriate terms. The derivative action can be eliminated by considering an infinitely small derivative co-efficient $T_D$ approaching zero. The integral reaction can be eliminated by selecting infinitely slow integration with $T_I$ approaching infinity. The appropriate choice of control modes for a given application depends upon the requirements for the system and the process characteristics.

A more useable form of Equation 4 is given by Equation 5:

$$G_c = K\, K_c\left[\frac{(T_1 S + 1)(T_d S + 1)}{T_1 S}\right] \quad \text{Eq. 5}$$

Figure 5A:
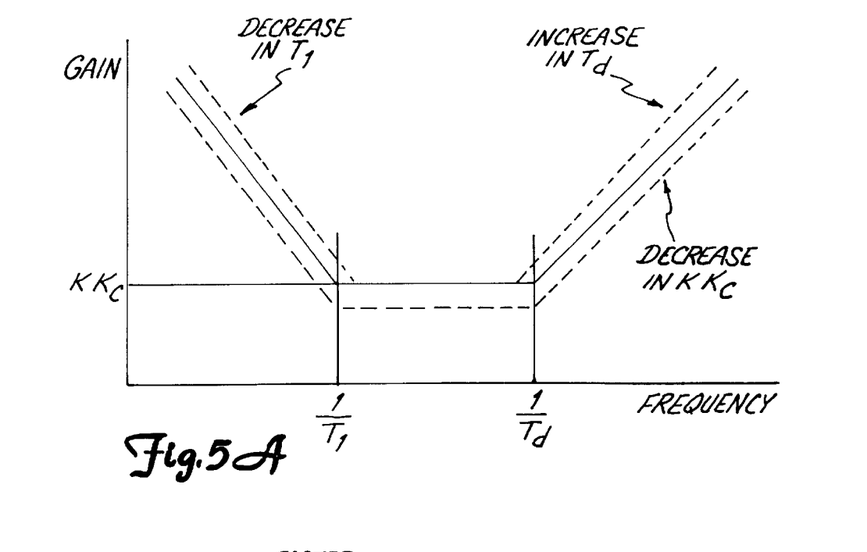
FIGS. 5A and 5B are graphs of gain versus frequency showing the result of changes of constants in the control algorithm.
Figure 5B:
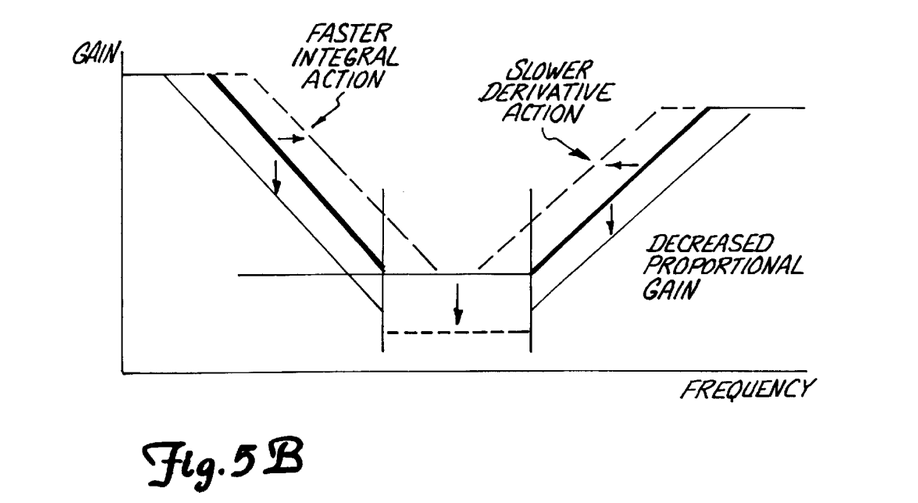

FIGS. 5A and 5B are graphs of gain versus frequency for Equation 5 and show the effect of variations in the parameters of Equation 5. Actual controller design represent an attempt to approximate this performance.

Figure 6:
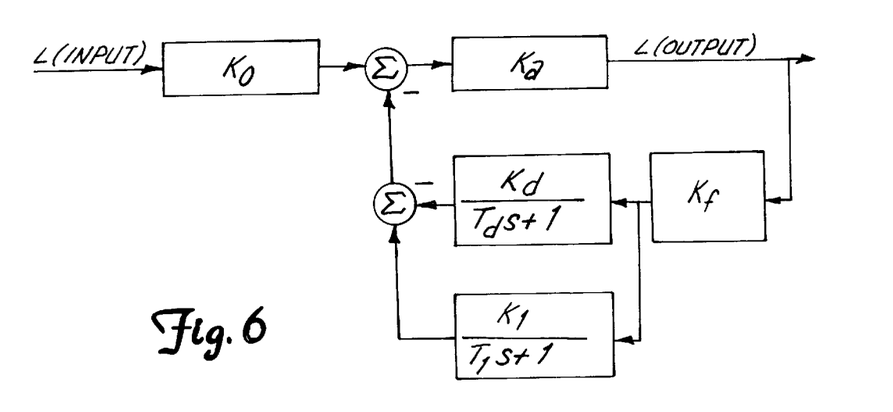
FIG. 6 is a block diagram illustrating a PID controller.

FIG. 6 is a block diagram showing an implementation of a three mode controller implementing a PID if unintentional dynamics of the amplifiers are neglected. The transfer function of this block diagram is given by:

$$G_c = \left[\frac{K_0 K_a}{1 + K_a K_f(K_d - K_1)}\right]\left[\frac{(T_1 S + 1)(T_d S + 1)}{\frac{T_1 T_d S^2}{1 + K_a K_f(K_d - K_1)} + \frac{T_1 + T_d + K_a K_f(K_0 T_1 - K_1 T_d)}{1 + K_a K_f(K_a - K_1)} S + 1}\right] \quad \text{Eq. 6}$$

This Equation may be greatly simplified by realizing that $K_I$ and $K_d$ are either equal to each other or approximately equal to each other and that the loop gain through either path is relatively high. Further, the integral time constant, $T_I$, may be regarded as much larger than the derivative time constant $T_d$. These assumptions are as follows:

$$K_a K_f K_I \gg 1 \quad \text{Eq. 7}$$

$$K_a K_f K_d \gg 1 \quad \text{Eq. 8}$$

$$T_I \gg T_d \quad \text{Eq. 9}$$

By definition, $\alpha$ is as follows:

$$\alpha = -K_a K_f(K_d - K_I) \quad \text{Eq. 10}$$

Thus, Equation 6 can be reduced to:

$$G_c \approx \frac{K_0 K_a}{1 - \alpha}\left[\frac{(T_1 S + 1)(T_d S + 1)}{\left(\frac{K_a K_f K_d}{1 - \alpha}T_1 S + 1\right)\left(\frac{T_d}{K_a K_f K_d}S + 1\right)}\right] \quad \text{Eq. 11}$$

Figure 4:
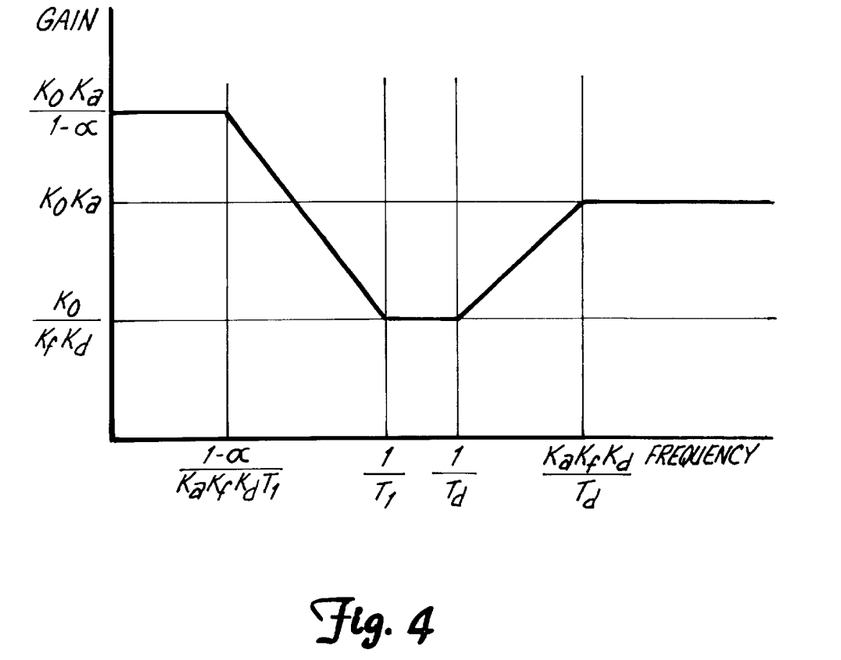
FIG. 4 is a graph of gain versus frequency.

As evident from Equation 11, at high frequencies the controller does not exhibit a true derivative action but the gain is limited to that of the forward path. Further, the static gain is not infinite, as is true with the integral action, but is limited to some finite value depending on the forward path gain the magnitude of $\alpha$. The static gain is sometimes called the maximum controller sensitivity or integral sensitivity and is a significant performance parameter. Depending on the controller design, $K_c$ is usually adjusted by physically varying either $K_f$ alone or $K_f$ and $K_0$ simultaneously. This latter method can be more expensive but has the advantage of minimizing variations in the static loop gain, $K_f K_d$. FIG. 4 is a graph of gain versus frequency for Equation 11 and shows the effects of the various parameters of the Equation.

In general, the regulatory control provided by the present invention provides a control output to heat source 38 which has more than two general states, an on condition and an off condition. In another aspect, the control output, over at least a portion of its range, is substantially continuous. In another aspect, the integral of the control output is, at least over a portion of its range, is never infinite, i.e., has no discontinuities.

The use of the regulatory control of the invention allows the control signal to take on multiple states. In one embodiment, the control output is a substantially continuous signal which is substantially continually responding to the error signal based upon a comparison of the actual temperature sensed by sensor 44 and the desired temperature determined by a temperature set point. The term "substantially continuous" is intended to include multi-level output produced by a digital to analog converter or other techniques in which discrete levels are provided.

Figure 7:
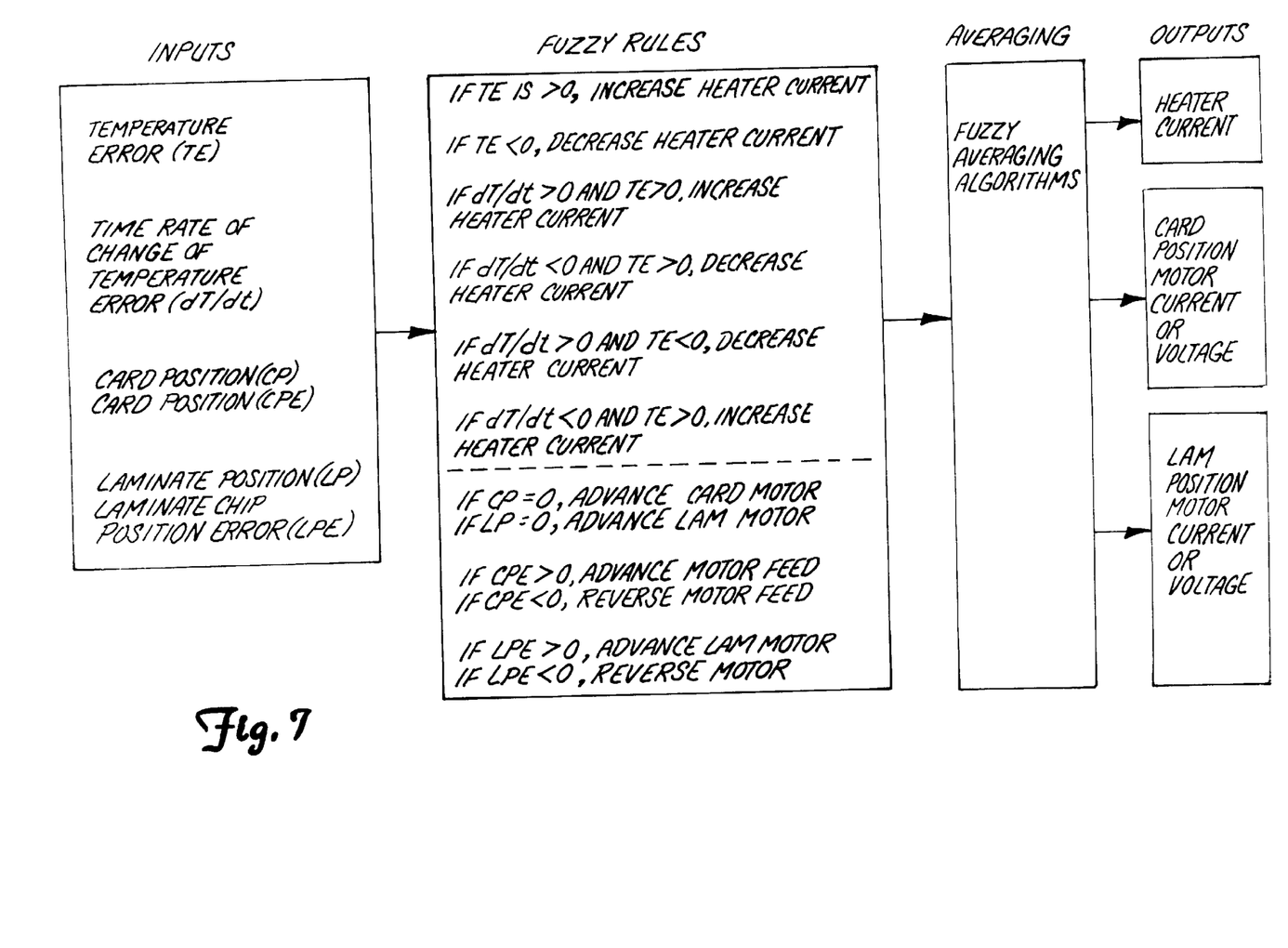
FIG. 7 is a diagram of a fuzzy based control algorithm.

Another example of control algorithm providing regulatory control is a fuzzy control algorithm as illustrated in FIG. 7. Using fuzzy control, a set of fuzzy rules are applied to various control inputs. In the example of FIG. 7, a temperature error signal (TE) which equals a target temperature minus a measured temperature, a time rate of change of the temperature error signal (dT/dt), a card position (CP) signal, a card position error (CPE), a laminator position (LP) and a laminator chip position error (LPE) signal are provided to a set of fuzzy rules. The fuzzy rules in this simplified example are as follows:

Rule 1: If TE is greater than zero, increase current to heat source 38.
Rule 2: If TE is less than zero, decrease current to heat source 38.
Rule 3: If dT/dt is greater than zero and TE is greater than zero, increase current to heat source 38.
Rule 4: If dT/dt is less than zero and TE is greater than zero, decrease current to heat source 38.
Rule 5: If dT/dt is greater than zero and TE is less than zero, decrease current to heat source 38.

Rule 6: If dT/dt is less than zero and TE is greater than zero, increase current to heat source 38.

The fuzzy rules can also be used to control the motion and positioning of the card:

Rule 7: If CP equals zero, advance card motor.
Rule 8: If LP equals zero, advance lamination motor.
Rule 9: If CPE is greater than zero, advance motor feed.
Rule 10: If CPE is less than zero, reverse motor feed.
Rule 11: If LPE is greater than zero, advance lamination motor.
Rule 12: If LPE is less than zero, reverse motor.

The outputs from the fuzzy rules are applied to fuzzy averaging algorithms which are used to provide outputs to the various controlled elements: heat source 38, card position motors 30 and 32 and laminator positioning motors 20 and 22.

The example of FIG. 7 is a very simple fuzzy algorithm and the present invention includes the application of more complex algorithms. For example, fuzzy membership functions can be stored in memory 58 and selected for application to a particular input signal based upon the value of the input signal or the value of other signals. The membership functions can be simple linear functions or can be more complex algorithms.

In general, the control algorithm should be optimally set to provide the best or preferred control. Such setting can be through a trial and error process called tuning. The particular heat source, mass of the heat source, card mass and material, laminate material, time of lamination and mass of the card support are all variables that make up the thermal system to which the control algorithm must be tuned. In the implementation of a laminator of a plastic identification card, many of these variables are fixed and can be stored in memory 58 for use by control algorithm performed by controller 50. The appropriate variables can be retrieved from memory 58 by identifying the particular substrate 12 either using a sensor 70 or through a manual input 72. The input can be used to provide information regarding the card size, card material, lamination material and lamination size. The input can be from a computer input or from a physical input such as a keyboard.

Although the present invention has been described with reference to preferred embodiments, workers skilled in the art will recognize that changes may be made in form and detail without departing from the spirit and scope of the invention. For example, although the invention is described in terms of algorithms, these algorithms can be implemented in software, hardware or their combination. The implementation is not limited to the particular examples set forth in this description. Laminator 10 can be a separate lamination station or can be an integral part of the printer such as an identification card printer. The heat source can be any heat source used to apply a protective layer including a thermal print head. The protective layer can be a thin film or a thicker layer such as "chip" or "patch" layers as they are called in the art. In one aspect, the control signal has at least two non-zero values.

What is claimed is:

1. A method of laminating an identification card substrate, comprising:
    positioning the identification card substrate;
    positioning a protective film proximate the substrate;
    applying pressure to the film against the substrate;
    applying heat to the film in response to a control signal;
    sensing temperature during the step of applying heat; and
    providing a control signal having at least two possible values as a function of the sensed temperature.

2. The method of claim 1 wherein the step of providing a control signal comprises providing a PI control signal.

3. The method of claim 1 wherein the step of providing a control signal comprises providing a PID control signal.

4. The method of claim 1 wherein the step of providing a control signal comprises a control signal as a function of a fuzzy rule.

5. The method of claim 1 wherein the control signal comprises a substantially continuous signal over at least a portion of a range of the control signal.

6. An identification card laminator for laminating a protective layer to an identification card substrate, comprising:
    a substrate positioner configured to secure the substrate during lamination;
    a protective layer positioner configured to position the protective layer on the substrate;
    a heat source proximate the protective layer positioner configured to heat the layer in response to a control signal;
    a temperature sensor proximate the heat source configured to provide a temperature output related to temperature of the heat source; and
    a controller coupled to the heat source and configured to provide the control signal to the heat source as a function of the temperature signal, the control signal having at least two values.

7. The identification card laminator of claim 6 wherein the control signal output is based upon a PI function.

8. The identification card laminator of claim 6 wherein the control signal output is based upon a PID function.

9. The identification card laminator of claim 6 wherein the control signal output is based upon a fuzzy rule.

10. The identification card laminator of claim 6 wherein the heat source comprises a resistive element.

11. The identification card laminator of claim 6 wherein the heat source comprises a quartz element.

12. The identification card laminator of claim 6 wherein the heat source comprises a roller.

13. The identification card laminator of claim 6 wherein the heat source comprises a thermal print head.

14. The identification card laminator of claim 6 wherein the control signal comprises a plurality of discrete signal levels forming a substantially continuous output.

15. The identification card laminator of claim 6 wherein the control signal is substantially continuous over at least a portion of a range of the signal.

16. The identification card laminator of claim 6 wherein the substrate positioner comprises a roller.

17. The identification card laminator of claim 6 wherein the film positioner includes a supply roll and a take-up roll and the film comprises a web carried therebetween.

18. The identification card laminator of claim 6 wherein the temperature sensor comprises an RTD.

19. The identification card laminator of claim 6 wherein the temperature sensor comprises a thermocouple.

20. The identification card laminator of claim 6 wherein the control signal is further a function of position of the identification card substrate relative to the heat source.

21. The identification card laminator of claim 6 wherein the control signal is further a function of displacement of the identification card substrate relative to the heat source.

22. The identification card laminator of claim 6 wherein the controller is implemented by a microprocessor in accordance with instructions stored in a memory.

23. The identification card laminator of claim 6 including a memory adapted to contain at least one coefficient used to generate the control signal.

24. The identification card laminator of claim 23 wherein the coefficient is related to a type of the identification card substrate.

25. The identification card laminator of claim 23 wherein the coefficient is related to a size of the identification card substrate.

26. The identification card laminator of claim 23 wherein the coefficient is related to a type of the protective film.

27. The identification card laminator of claim 23 further including an input to receive coefficients stored in the memory.

28. The identification card laminator of claim 27 wherein the input comprises a manual input.

29. The identification card laminator of claim 23 further including a sensor configured to sensor a type of the identification card substrate and wherein a coefficient is selected from the memory based upon an output from the sensor.

30. The identification card laminator of claim 9 wherein the fuzzy rule comprises:
   if a temperature error is greater than zero, increase the heat output from the heat source.

31. The identification card laminator of claim 9 wherein the fuzzy rule comprises:
   if a temperature error is less than zero, decrease the heat output from the heat source.

32. The identification card laminator of claim 9 wherein the fuzzy rule comprises:
   if a change in temperature is greater than zero and a temperature error is greater than zero, increase the output from the heat source.

33. The identification card laminator of claim 9 wherein the fuzzy rule comprises:
   if a change is temperature is less than zero and a temperature error is greater than zero, decrease the output from the heat source.

34. The identification card laminator of claim 9 wherein the fuzzy rule comprises:
   if a change in temperature is greater than zero and a temperature error is less than zero, decrease the output from the heat source.

35. The identification card laminator of claim 9 wherein the fuzzy rule comprises:
   if a change in temperature is less than zero and a temperature error is greater than zero, increase the output from the heat source.

36. The identification card laminator of claim 9 further including at least one fuzzy rule used to control position of the identification card substrate.

37. The identification card laminator of claim 36 wherein the fuzzy rule comprises:
   if the identification card substrate position is zero, advance the substrate positioner.

38. The identification card laminator of claim 36 wherein the fuzzy rule comprises:
   if the position of the protective film is zero, advance the film positioner.

39. The identification card laminator of claim 36 wherein the fuzzy rule comprises:
   if a substrate position error is greater than zero, advance the substrate positioner.

40. The identification card laminator of claim 36 wherein the fuzzy rule comprises:
   if a substrate position error is less than zero, reverse the substrate positioner.

41. The identification card laminator of claim 36 wherein the fuzzy rule comprises:
   if a film position error is greater than zero, advance the film positioner.

42. The identification card laminator of claim 36 wherein the fuzzy rule comprises:
   if a film position error is less than zero, reverse the film positioner.

43. The identification card laminator of claim 6 wherein the controller further performs a self-tuning function by changing a parameter of the lamination process and monitoring a resulting change in the temperature output in the temperature sensor.

44. The identification card laminator of claim 43 wherein the controller stores coefficients in a memory for use in providing the control signal and wherein the coefficients are a function of the self-tuning.

45. The identification card laminator of claim 6 wherein the at least two values comprise non-zero values.

* * * * *

UNITED STATES PATENT AND TRADEMARK OFFICE
CERTIFICATE OF CORRECTION

PATENT NO. : 6,264,774 B1
DATED : July 24, 2001
INVENTOR(S) : Lenz et al.

It is certified that error appears in the above-identified patent and that said Letters Patent is hereby corrected as shown below:

Columns 5 and 6,
Between lines 39 and 48, replace equation 6 with the following:

$$G_C = \left[\frac{K_0 K_a}{1+K_a K_f(K_d - K_1)}\right]\left[\frac{(T_1 S + 1)(T_d S + 1)}{\frac{T_1 T_d s^2}{1+K_a K_f(K_d-K_1)} + \frac{T_1+T_d+K_a K_f(K_0 T_1 - K_1 T_d)}{1+K_a K_f(K_d-K_1)} S + 1}\right]$$

Column 9,
Line 15, replace "sensor" with -- sense --.
Line 33, replace "is" first occurrence with -- in --.

Signed and Sealed this

Ninth Day of July, 2002

*Attest:*

*Attesting Officer*

JAMES E. ROGAN
*Director of the United States Patent and Trademark Office*